US009292489B1

(12) United States Patent
Sak et al.

(10) Patent No.: US 9,292,489 B1
(45) Date of Patent: Mar. 22, 2016

(54) SUB-LEXICAL LANGUAGE MODELS WITH WORD LEVEL PRONUNCIATION LEXICONS

(71) Applicant: Google Inc., Mountain View, CA (US)

(72) Inventors: Hasim Sak, New York, NY (US); Murat Saraclar, New York, NY (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 13/855,893

(22) Filed: Apr. 3, 2013

Related U.S. Application Data (60) Provisional application No. 61/783,718, filed on Mar. 14, 2013, provisional application No. 61/753,092, filed on Jan. 16, 2013.

(51) Int. Cl.
| | |
|---|---|
| *G10L 15/08* | (2006.01) |
| *G10L 15/22* | (2006.01) |
| *G10L 15/183* | (2013.01) |
| *G06F 17/27* | (2006.01) |
| *G10L 13/08* | (2013.01) |
| *G10L 13/10* | (2013.01) |
| *G10L 15/00* | (2013.01) |
| *G10L 15/26* | (2006.01) |

(52) U.S. Cl.
CPC ........ *G06F 17/2785* (2013.01); *G06F 17/2775* (2013.01); *G10L 13/08* (2013.01); *G10L 13/10* (2013.01); *G10L 15/00* (2013.01); *G10L 15/183* (2013.01); *G10L 15/26* (2013.01)

(58) Field of Classification Search
CPC ......... G10L 13/10; G10L 15/04; G10L 15/26; G06F 17/2775
See application file for complete search history.

(56) References Cited

U.S. PATENT DOCUMENTS

| 7,181,398 B2 * | 2/2007 | Thong ..................... G10L 15/08 704/251 |
| 2006/0020461 A1 * | 1/2006 | Ogawa ..................... G10L 15/04 704/251 |
| 2007/0124142 A1 * | 5/2007 | Mukherjee .............. G10L 13/10 704/235 |
| 2013/0173269 A1 * | 7/2013 | Adler .................. G06F 17/2775 704/251 |

OTHER PUBLICATIONS

Szoke et al "Hybrid word-subword decoding for spoken term detection" ACM SIGIR Conference 2008.*
Kneissler et al "Speech recognition for huge vocabularies by using optimized sub-word units" Eurospeech 2001.*
Szarvas et al "Finite-state transducer based modeling of morphosyntax with applications to Hungarian LVCSR" IEEE ICASP 2003.*
Alluazen, Cyril et al., "A Generalized Construction of Integrated Speech Recognition Transducers," IEEE International Conference on Acoustics, Speech, and Signal Processing, May 2004, 4 pages.
Alluazen, Cyril et al., "Generalized Algorithms for Constructing Statistical Language Models," Proceedings of the 41st Annual Meeting of the Association for Computational Linguistics, Jul. 2003, 8 pages.

(Continued)

*Primary Examiner* — Jialong He
*Assistant Examiner* — Yi-Sheng Wang
(74) *Attorney, Agent, or Firm* — Fish & Richardson, P.C.

(57) ABSTRACT

An automatic speech recognition (ASR) system and method are provided for using sub-lexical language models together with word level pronunciation lexicons. These approaches operate by introducing a transduction between sequences of sub-lexical units and sequences of words.

23 Claims, 5 Drawing Sheets

(56) References Cited

OTHER PUBLICATIONS

Arisoy Ebru et al., "Language Modeling for Automatic Turkish Broadcast News Transcription," Interspeech 2007, 8th Annual Conference of the International Speech Communication Association, Aug. 2007, 4 pages.

Arisoy, Ebru et al., "Turkish Broadcast News Transcription and Retrieval," IEEE Transactions on Audio, Speech, and Language Processing, vol. 17, No. 5, Jul. 2009, 10 pages.

Arisoy, Ebru, "Lattice Extension and Vocabulary Adaptation for Turkish LVCSR," IEEE Transactions on Audio, Speech, and Language Processing, vol. 17, No. 1, Jan. 2009, 11 pages.

Byrne, W. et al., "On Large Vocabulary Continuous Speech Recognition of Highly Inflectional Language—Czech," Eurospeech 2001—Scandinavia, 7th European Conference on Speech Communication and Technology, Sep. 2001, 4 pages.

Erdogan, Hakan et al., "Incorporating Language Constraints in Sub-Word Based Speech Recognition," IEEE Workshop on Automatic Speech Recognition and Understanding, Nov. 2005, 6 pages.

Geutner, P., "Using Morphology Towards Better Large-Vocabulary Speech Recognition Systems," IEEE Acoustics, Speech, and Signal Processing, May 1995, 4 pages.

Hirsimaki, Teemu et al., "Unlimited Vocabulary Speech Recognition with Morph Language Models Applied to Finnish," Computer Speech & Language, vol. 20, No. 4, Oct. 2006, 34 pages.

Kwon, Oh-Wook, "Korean Large Vocabulary Continuous Speech Recognition With Morpheme-Based Recognition Units," Journal of Speech Communication, vol. 39, Issue 3-4, Feb. 2003, 14 pages.

Mihajlok, Peter et al., "A Morpho-graphemic Approach for the Recognition of Spontaneous Speech in Agglutinative Languages—like Hungarian," Interspeech 2007, 8th Annual Conference of the International Speech Communication Association, Aug. 2007, 4 pages.

Mohri, Mehryar, "Finite-State Transducers in Language and Speech Processing," Computational Linguistics, vol. 23, No. 2, Jun. 1997, 44 pages.

Rotovnik, Tomaz et al., "Large Vocabulary Continuous Speech Recognition of an Inflected Language using Stems and Endings," Speech Communication 49, 6, Jun. 2007, 35 pages.

Sak, Hasim et al., "Morpholexical and Discriminative Language Models for Turkish Automatic Speech Recognition," IEEE Transactions on Audio, Speech, and Language Processing, vol. 20, No. 8, Oct. 2012, 11 pages.

* cited by examiner

SUB-LEXICAL LANGUAGE MODELS WITH WORD LEVEL PRONUNCIATION LEXICONS

CROSS-REFERENCE TO RELATED APPLICATIONS

This application claims the benefit of U.S. Provisional Application No. 61/783,718, filed Mar. 14, 2013 and U.S. Provisional Application No. 61/753,092, filed Jan. 16, 2013, which are incorporated herein in its entirety by reference.

FIELD

This specification describes technologies related to automatic speech recognition (ASR).

BACKGROUND

Automatic speech recognition (ASR) is an important technology that is used in mobile devices to allow users to provide input as spoken words. In order to be useful, ASR systems must be able to generate accurate results using reasonable amounts of resources.

In general, achieving more accurate results will require more resources, such as more memory or processing power. The use of additional resources can allow more sophisticated modeling of speech input that can improve results. However, ASR is a technology that must often be performed by a mobile device with limited resources, but achieving accurate results is still important because otherwise ASR may be unable to generate results or may generate mistaken results.

SUMMARY

The methods and systems described herein provide automatic speech recognition with improved accuracy.

In general, one innovative aspect of the subject matter described in this specification can be embodied in a process that is performed by a data processing apparatus. The process includes accessing a word level pronunciation lexicon and a word level training text corpus for a natural language; segmenting, using a word decomposition system, the word level training text corpus into sub-lexical units; training an n-gram language model over the sub-lexical units to produce a sub-lexical language model; constructing, using the word decomposition system, a word to sub-lexical unit mapping transducer; constructing a word level language model by composing the mapping transducer with the sub-lexical language model; and constructing a speech decoding network by composing at least the word level pronunciation lexicon, and the word level language model.

Another innovative aspect of the subject matter descried in this specification can be embodied in another process that is performed by a data processing apparatus. The process includes segmenting a word level text corpus into sub-lexical units to produce a segmented corpus; training a sub-lexical language model using the segmented corpus; constructing a word level language model by decomposing words and mapping them to the sub-lexical language model; and recognizing a speech input using the word level language model along with context information and word pronunciation information.

Other embodiments of these aspects include corresponding systems, apparatus, and computer programs, configured to perform the actions of the methods, encoded on computer storage devices.

These and other embodiments can each optionally include one or more of the following features. For instance, embodiments may further include receiving an audio stream from a user, and recognizing the audio stream, using the decoding network. In such embodiments, recognizing the audio stream may include identifying a user command from at least a portion of the audio stream, using the decoding network, and performing the user command. Also, there may be embodiments in which the natural language is an agglutinative or morphologically rich language. Embodiments may also further include detecting ambiguous outputs from the word decomposition system and obtaining a single segmentation, using a disambiguation mechanism, for each of the ambiguous outputs. Also, the n-gram language model is represented as a deterministic weighted finite-state automaton. In one embodiment the transducer maps each word to one segmentation. In another embodiment, the transducer maps each word to one or more segmentations. In another embodiment, constructing the speech decoding network further comprises composing a context dependency model with the word level pronunciation lexicon and the word level language model.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

In the drawings, like numbers reference corresponding parts throughout.

DETAILED DESCRIPTION

Language modeling for morphologically rich languages has proven to be challenging. Large numbers of words in these languages result in high out-of-vocabulary (OOV) rates for a fixed vocabulary size. The large number of words in such languages also contributes to data sparseness, yielding poor performance in language modeling.

Various technologies currently attempt automatic speech recognition for voice search and input method editor (IME) services in morphologically rich languages. Existing methods use word level language models with word level pronunciation lexicons or sub-lexical language models with sub-lexical pronunciation lexicons. Neither of these approaches is ideal by themselves because word level language models may be sub-optimal for morphologically rich languages, and sub-lexical pronunciation lexicons may lead to errors, since they do not take the intra-word context into account.

According to some implementations, an ASR system may utilize word level language models and pronunciation lexicons that map words to phones. For agglutinative or morphologically rich languages, word level language models are sub-optimal due to high out-of-vocabulary rates and data sparseness problems. Therefore, embodiments may segment words into sub-lexical units in order to alleviate these problems in language modeling. However, determining the pronunciations for these word segments is not trivial, since the pronunciations depend on intra-word context. Furthermore, sub-lexical language models can over-generate and produce sub-lexical sequences that do not correspond to any valid word in the language. Finally, when a morphological analyzer is used as a computational lexicon to map morphemes to phonemes, due to morphological parsing ambiguities, the use of such a morphological analyzer presents some challenges for ASR systems.

To address the high growth rate of vocabulary and the OOV problem in morphologically rich languages, using grammatical or statistical sub-lexical units for language modeling may be used. The grammatical sub-lexical units can be morphological units such as morphemes or some grouping of them such as stems and endings (groupings of suffixes). The statistical sub-lexical units can be obtained by segmenting words using statistical methods. The morphological information is also useful for improving language modeling.

However, these sub-lexical approaches to language modeling may have some differences when compared to word based language modeling. First of all, modeling the pronunciations for sub-lexical units is harder than modeling the pronunciations for words. The pronunciations of sub-lexical units in isolation can be ambiguous. The correct pronunciation depends on the phonemic context and cannot be determined without knowing the previous and following sub-lexical units for some languages. Second, sub-lexical language models are able to generate arbitrary sequences of sub-lexical units including those sequences that do not correspond to valid word forms. Therefore, it may be important to alter these invalid sequences using post-processing techniques. Third, integrating the morphological parser as a computational lexicon into the decoding network to alter the invalid morpheme sequences presents some difficulties. The morphological parser is generally ambiguous and the ambiguity cannot be resolved easily for efficiency purposes in decoding.

Embodiments provide a method and system for using sub-lexical language models together with word level pronunciation lexicons. This goal is achieved by introducing a transduction between sequences of sub-lexical units and sequences of words. By using such an approach, it becomes possible to capitalize on the benefits of operating at the sub-lexical level and the word level as part of a process that avoids the problems of operating at only one of these levels.

By combining these approaches, embodiments offer improved speech recognition accuracy over the results provided by current technologies for such languages.

The decomposition approaches used in implementations may be divided into two classes. The first class of approaches uses a linguistically motivated approach, in which words are decomposed morphologically into linguistic units. For example, morpheme-based language models have been proposed for German, Czech, and Korean.

A statistical language model based on morphological decomposition of words into roots and inflectional groups that contain the inflectional features for each derived form has been proposed for morphological disambiguation of Turkish text. Stems and endings have been used for language modeling for Turkish and Slovenian. Using linguistic information has the advantage that the speech recognition outputs can be processed to filter invalid sequences of morphological units.

This second class of studies on agglutinative languages uses a purely statistical approach to decompose words into sub-word units. Statistical sub-word units, known as morphs, have been used for language modeling of Finnish, Hungarian, and Turkish. Sub-word language models are effective in alleviating the out-of-vocabulary (OOV) problem, and sub-word language models have the advantage that sub-word language models do not require any language-specific linguistic processing, which may be costly to build for all languages. However, the speech decoder may generate ungrammatical sub-word sequences and post-processing of the sub-word lattices may be necessary to correct the errors and increase the accuracy using linguistic information.

Weighted finite-state transducers (WFSTs) are typically used to represent all the components of a speech recognition system. A composition algorithm is used to efficiently combine the components into a single finite-state decoding network. Such composition provides the output of one function as the input of another.

In a finite-state transducer-based ASR system, a decoding network D may be constructed by composing the following finite-state models: a context dependency model C mapping context-dependent phones to context-independent phones, a pronunciation lexicon L mapping context-independent phone sequences to words, and an n-gram language model G assigning probabilities to word sequences. In a WFST framework, this is expressed as $D=C \circ L \circ G$, where $\circ$ is the composition operator.

Implementations may provide a method for using sub-lexical units in language modeling while keeping the pronunciation lexicon at a word level. First, this method builds a finite-state transducer T to map words to sub-lexical units. For this purpose, the input word vocabulary is decomposed into sub-lexical units using one of the previous approaches, which may be linguistic or statistical. Then, using this transducer, embodiments segment the language model training text data into the sub-lexical units. Embodiments train a standard n-gram language model over the segmented text data. Finally, embodiments compose the resulting sub-lexical language model, the segmentation transducer, and the context dependency network together to build the speech decoding network. Once constructed, the speech decoding network can operate to provide more accurate ASR results.

Figure 1:
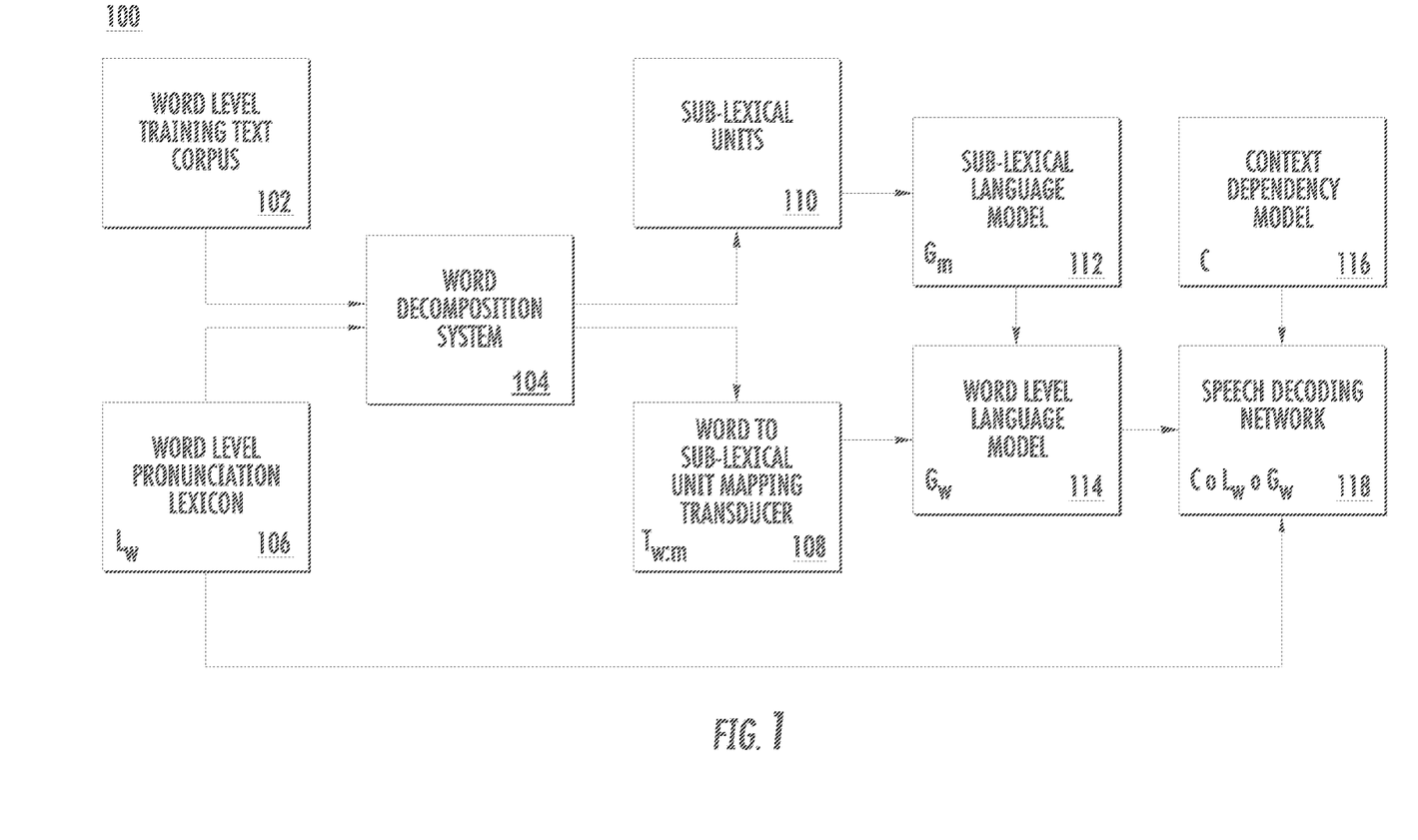
FIG. 1 is a flow diagram of information between constituent parts of a system implementation.

FIG. 1 is a flow diagram of information between constituent parts of a system implementation. The flow diagram 100 shows different parts of such an implementation and how they interact. More specifics about these constituent parts will be discussed in association with FIGS. 2A-2E.

Implementations may include a word level training text corpus 102, a word level pronunciation lexicon 106 ($L_w$), and a word decomposition system 104. Word decomposition system 104 may be linguistic or statistical as discussed above. Word decomposition system 104 receives information from word level training text corpus 102 and from word level pronunciation lexicon 106. Word decomposition system 104 performs decomposition on the information from these two groups of information to generate output from each group of information.

Word decomposition system 104 processes word level training text corpus 102 to produce a group of sub-lexical units based on decomposing the words in word level training text corpus 102. If the word decomposition has ambiguous outputs, a disambiguation mechanism may be used, such as a heuristic or algorithm that receives ambiguous outputs and analyzes them to determine the best candidate from among the suggested decomposition outputs.

Additionally, word decomposition system 104 segments information from word level pronunciation lexicon 106 to construct a word to sub-lexical unit mapping transducer 108 ($T_{w:m}$). It may be noted that a given word may have multiple segmentations.

Once word decomposition system 104 has produced sub-lexical units 110, those sub-lexical units can be used to train an n-gram language model. For example, such a model may be a sub-lexical language model 112 ($G_m$). In one embodiment, sub-lexical language model 112 may be efficiently represented as a deterministic weighted finite-state automaton.

Sub-lexical language model 112 may be composed with mapping transducer 108. This composition may be represented as $T_{w:m} \circ G_m$. The composition is then projected to provide word level language model 114 ($G_w$), which may be found as $G_w = \text{Proj}(T_{w:m} \circ G_m)$.

Finally, implementations produce the speech decoding network 118 using the context dependency model 116 (C) as well as word level language model 114 and the word level pronunciation lexicon 106. Thus, speech decoding network 118 is constructed as $C \circ L_w \circ G_w$. This approach to speech decoding works because of the way the construction of $G_w$ is built by using information about sub-lexical units.

Figure 2A:
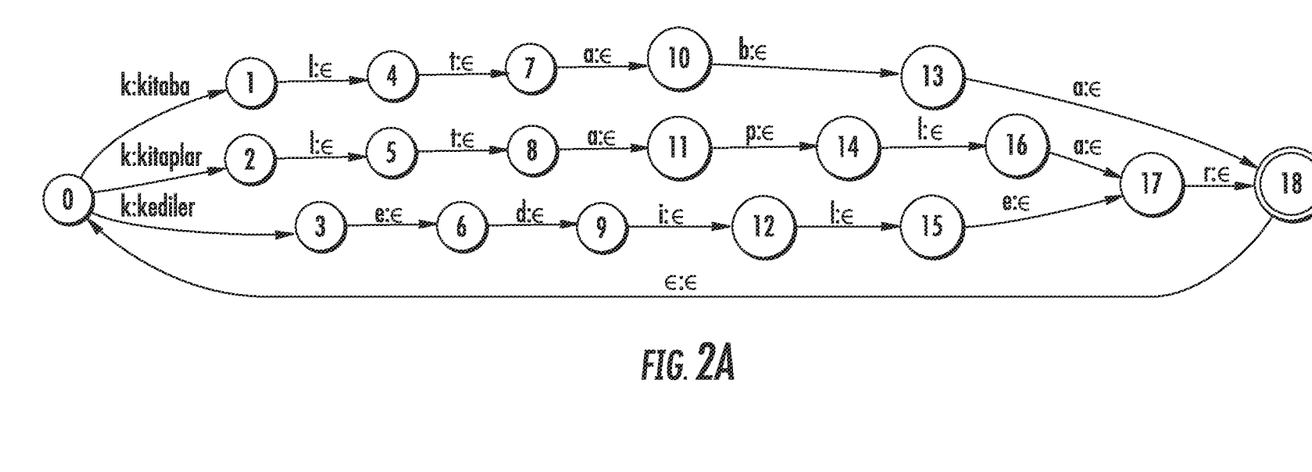
FIG. 2A is a diagram of a finite-state machine of a word level pronunciation lexicon, $L_w$.

FIG. 2A is a diagram of a finite-state machine of a word level pronunciation lexicon, $L_w$. This finite-state machine shows a group of states that have transitions based on sounds produced by articulating the individual parts of specific similar words in a natural language. For example, transitions provide a path to articulate each letter of the Turkish word "kitaplar." Using a word level pronunciation lexicon is helpful because it is possible to provide specific transitions for each word recognized by the lexicon. However, word level pronunciation lexicons may be more likely to experience issues with the OOV problem. FIG. 2A also illustrates that multiple words may share a state where appropriate, such as that states 15 and 16 both pass through state 17 on their way to state 18.

Figure 2B:
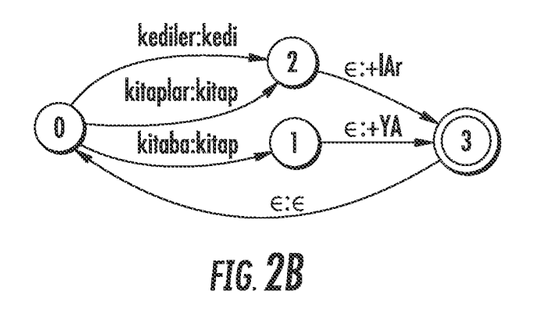
FIG. 2B is a diagram of a finite-state machine of a word to sub-lexical mapping transducer, $T_{w:m}$.

FIG. 2B is a diagram of a finite-state machine of a word to sub-lexical mapping transducer, $T_{w:m}$. Such a finite-state machine receives complete words, and provides transitions that allow such word to be segmented. For example, "kitaplar" may be segmented into the units "kitap" and "lAr." In FIG. 2B as well, multiple words may share a state where appropriate. The mapping transducer may be constructed, as noted above, by segmenting the words in the pronunciation lexicon using the word decomposition system.

Figure 2C:
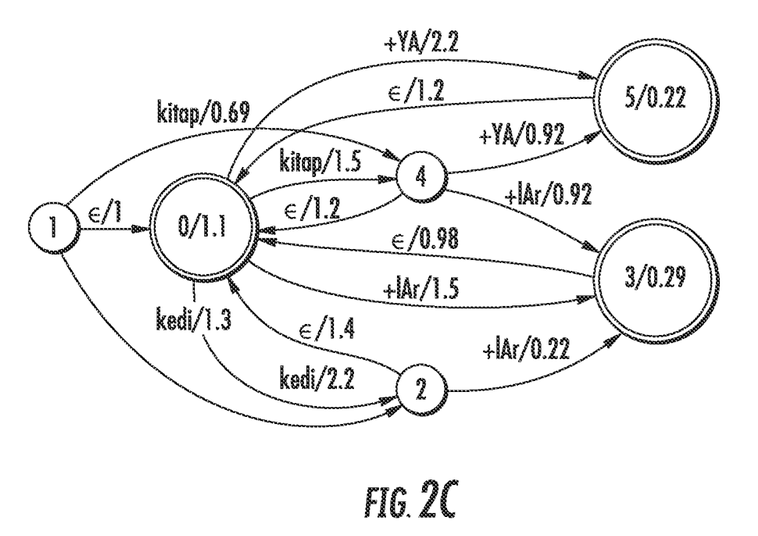
FIG. 2C is a diagram of a finite-state machine of a sub-lexical language model, $G_m$.

FIG. 2C is a diagram of a finite-state machine of a sub-lexical language model, $G_m$. This sub-lexical language model represents an n-gram language model that is trained over a segmented version of the word level training text corpus. This finite-state machine represents acceptable relationships between sub-lexical parts of whole words.

Figure 2D:
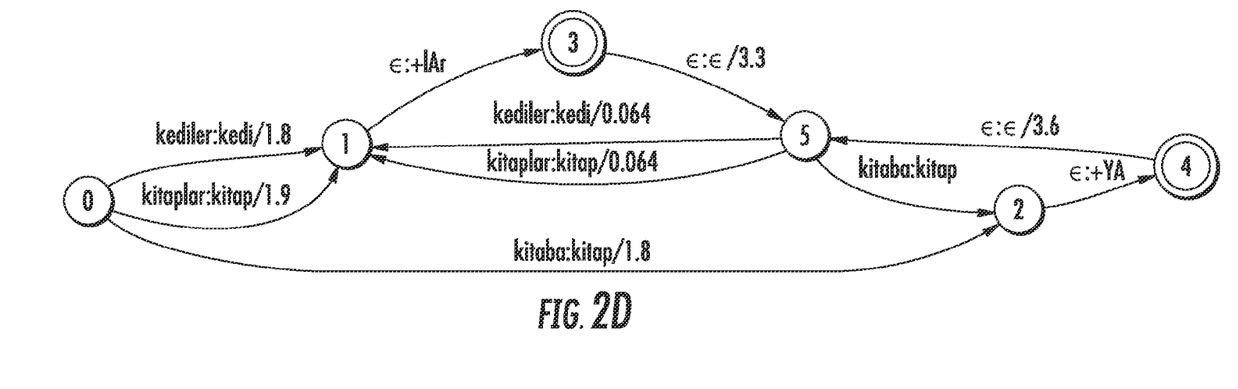
FIG. 2D is a diagram of a finite-state machine of a mapping transducer composed with word level language model, $T_{w:m} \circ G_m$.

FIG. 2D is a diagram of a finite-state machine of a mapping transducer composed with word level language model, $T_{w:m} \circ G_m$. The result of this composition is to create a finite-state machine that attempts to recognize words based on their parts. $G_m$ manages inputs that are sub-lexical units, and $T_{w:m}$ provides words and transforms them into sub-lexical units. Thus, composing these machines improves the ability of the machines to recognize words by recognizing the words after they have been segments.

Figure 2E:
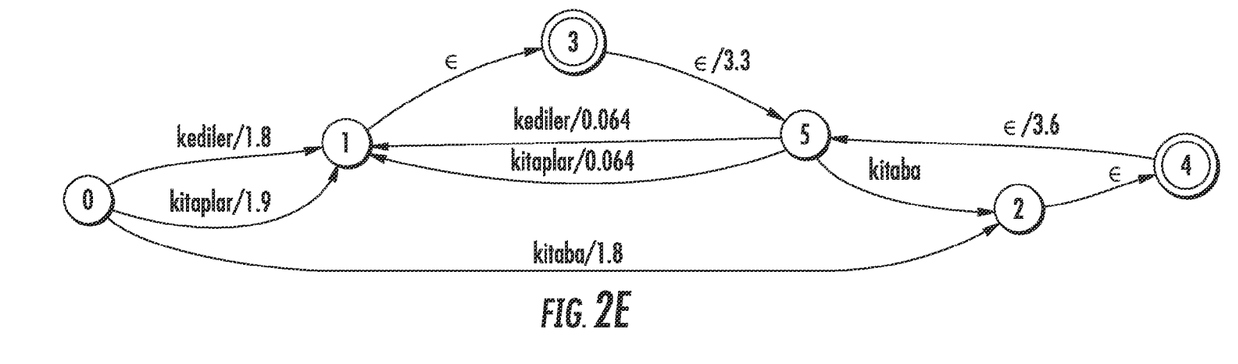
FIG. 2E is a diagram of a finite-state machine of an input projected version of FIG. 2D, $G_w = \mathrm{Proj}(T_{w:m} \circ G_m)$.

FIG. 2E is a diagram of a finite-state machine of an input projected version of FIG. 2D, $G_w = \text{Proj}(T_{w:m} \circ G_m)$. The result of this projection is to use the information from the composition $T_{w:m} \circ G_m$ to provide a finite-state machine that is able to recognize words well. The transitions included in the finite-state machine allow analysis of an input at the word level based on underlying information about the sub-lexical units of the words. The projection takes the finite-state machine from FIG. 2D and modifies it so that it can handle words directly. As can be seen in FIG. 2E, there are extra epsilon transitions in addition to those coming from language model back-off transitions. The extra epsilon transitions can be removed prior to decoding network construction to increase the decoding efficiency.

Figure 3:
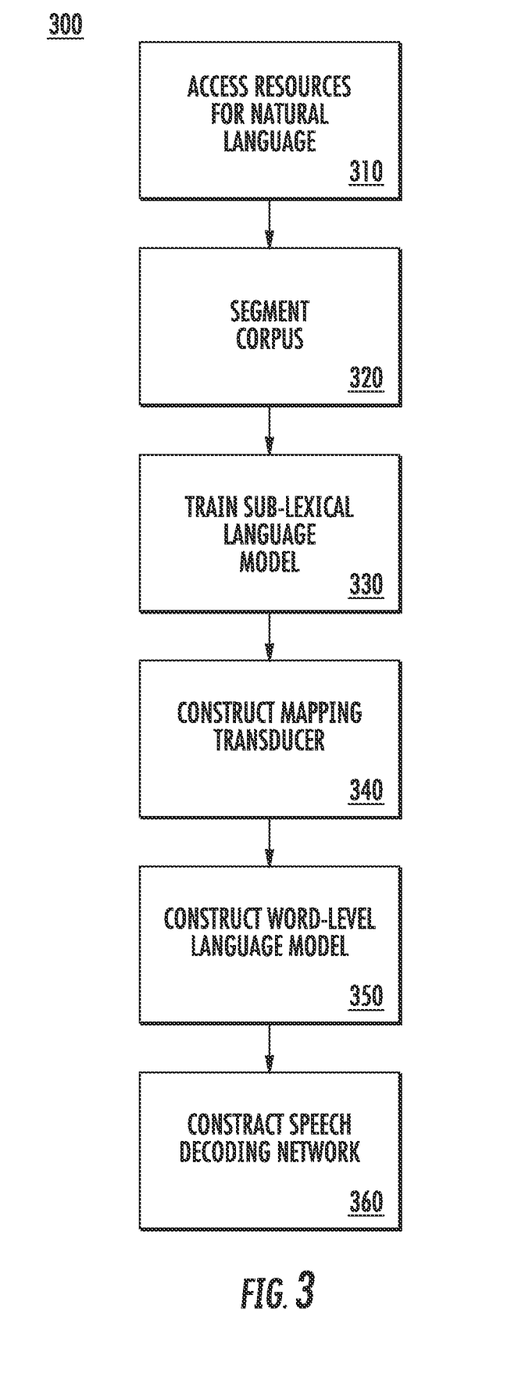
FIG. 3 is a flow chart of steps in the method of one implementation.

FIG. 3 is a flow chart of steps in the method of one implementation.

In stage 310, implementations access resources for a natural language. Some implementations may require that a word level pronunciation lexicon $L_w$ as in FIG. 1 and a word level training text corpus are available for a given language. Some embodiments also assume the existence of a linguistic or statistical word decomposition system.

In stage 320, the training corpus is segmented into sub-lexical units using the word decomposition system. If the decomposition system has ambiguous outputs, a disambiguation mechanism is utilized to obtain a single segmentation or the multiple outputs may be handled independently.

In stage 330, an n-gram language model over the sub-lexical units is trained on this corpus and efficiently represented as a deterministic weighted finite-state automaton, as shown as $G_m$ in FIG. 3.

In stage 340, the word to sub-lexical unit mapping transducer $T_{w:m}$ in FIG. 2 is constructed by segmenting the words in the pronunciation lexicon using the word decomposition system. Of note, this transducer may include multiple segmentations for each word.

In stage 350, the mapping transducer and sub-lexical language model are composed as in FIG. 2D and projected to the word level in order to obtain the word level language model $G_w$ in FIG. 2E.

In stage 360, the decoding network is constructed using the context dependency, lexicon and word level language model transducers as $C \circ L_w \circ G_w$.

Optionally, after constructing the decoding network, an audio stream may be received by a user and the audio stream may be recognized using the decoding network. Additionally, recognizing the audio stream may allow an implementation to recognize a user command from the audio stream, which it may subsequently perform.

Embodiments presented herein provide the potential to improve accuracy by borrowing elements of word-level and sub-lexical approaches.

A number of implementations have been described. Nevertheless, it will be understood that various modifications may be made without departing from the spirit and scope of the disclosure. For example, various forms of the methods shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

The invention claimed is:

1. A method performed by a data processing apparatus, the method comprising:
    accessing a word level pronunciation lexicon and a word level training text corpus for a natural language;
    segmenting, using a word decomposition system, the word level training text corpus into sub-lexical units;

training an n-gram language model over the sub-lexical units to produce a sub-lexical language model;
constructing, using the word decomposition system, a word to sub-lexical unit mapping transducer;
constructing a word level language model by:
obtaining a result of composing the mapping transducer with the sub-lexical language model, and
performing a projection on the result of the composition of the mapping transducer and the sub-lexical language model;
constructing a speech decoding network at least by composing a context dependency model with the word level pronunciation lexicon and with the word level language model;
receiving an audio stream from a user; and
recognizing the audio stream, using the speech decoding network.

2. The method of claim 1, wherein recognizing the audio stream comprises:
identifying a user command from at least a portion of the audio stream, using the speech decoding network; and
performing the user command.

3. The method of claim 1, wherein the natural language is an agglutinative or morphologically rich language.

4. The method of claim 1, further comprising:
detecting ambiguous outputs from the word decomposition system; and
obtaining a single segmentation, using a disambiguation mechanism, for each of the ambiguous outputs.

5. The method of claim 1, wherein the n-gram language model is represented as a deterministic weighted finite-state automaton.

6. The method of claim 1, wherein the mapping transducer maps each word to one segmentation.

7. The method of claim 1, wherein the mapping transducer maps each word to one or more segmentations.

8. The method of claim 1, wherein the speech decoding network is defined as:

$$C \circ L_w \circ \mathrm{Proj}(T_w \circ G_m)$$

wherein C represents the context dependency model, $L_w$ represents the world level pronunciation lexicon, $T_w$ represents the mapping transducer, $G_m$ represents the sub-lexical language model, and Proj represents performing the projection on the result of the composition of the mapping transducer with the sub-lexical language model.

9. The method of claim 1, wherein segmenting the word level training text corpus into sub-lexical units using the word decomposition system comprises segmenting the word level training text corpus into sub-lexical units using a linguistic word decomposition system or a statistical word decomposition system.

10. The method of claim 1, wherein the mapping transducer is associated with a finite-state machine, wherein an initial state of the finite-state machine represents a word and transitions between states of the finite-state machine represent sub-lexical units.

11. A system comprising:
one or more computers and one or more storage devices storing instructions that are operable, when executed by the one or more computers, to cause the one or more computers to perform operations comprising:
accessing a word level pronunciation lexicon and a word level training text corpus for a natural language;
segmenting, using a word decomposition system, the word level training text corpus into sub-lexical units;
training an n-gram language model over the sub-lexical units to produce a sub-lexical language model;
constructing, using the word decomposition system, a word to sub-lexical unit mapping transducer;
constructing a word level language model by:
obtaining a result of composing the mapping transducer with the sub-lexical language model, and
performing a projection on the result of the composition of the mapping transducer and the sub-lexical language model;
constructing a speech decoding network at least by composing a context dependency model with the word level pronunciation lexicon and with the word level language model;
receiving an audio stream from a user; and
recognizing the audio stream, using the speech decoding network.

12. The system of claim 11, the operations further comprising:
detecting ambiguous outputs from the word decomposition system; and
obtaining a single segmentation, using a disambiguation mechanism, for each of the ambiguous outputs.

13. The system of claim 11, wherein the n-gram language model is represented as a deterministic weighted finite-state automaton.

14. The system of claim 11, wherein the mapping transducer maps each word to one segmentation.

15. The system of claim 11, wherein the mapping transducer maps each word to one or more segmentations.

16. A non-transitory computer-readable medium storing software comprising instructions executable by one or more computers which, upon such execution, cause the one or more computers to perform operations comprising:
accessing a word level pronunciation lexicon and a word level training text corpus for a natural language;
segmenting, using a word decomposition system, the word level training text corpus into sub-lexical units;
training an n-gram language model over the sub-lexical units to produce a sub-lexical language model;
constructing, using the word decomposition system, a word to sub-lexical unit mapping transducer;
constructing a word level language model by:
obtaining a result of composing the mapping transducer with the sub-lexical language model, and
performing a projection on the result of the composition of the mapping transducer and the sub-lexical language model;
constructing a speech decoding network at least by composing a context dependency model with the word level pronunciation lexicon and with the word level language model;
receiving an audio stream from a user; and
recognizing the audio stream, using the speech decoding network.

17. The medium of claim 16, wherein recognizing the audio stream comprises:
identifying a user command from at least a portion of the audio stream, using the speech decoding network; and
performing the user command.

18. The medium of claim 16, wherein the natural language is an agglutinative or morphologically rich language.

19. The medium of claim 16, the operations further comprising:
detecting ambiguous outputs from the word decomposition system; and obtaining a single segmentation, using a disambiguation mechanism, for each of the ambiguous outputs.

20. The medium of claim 16, wherein the n-gram language model is represented as a deterministic weighted finite-state automaton.

21. The medium of claim 16, wherein the mapping transducer maps each word to one segmentation.

22. The medium of claim 16, wherein the mapping transducer maps each word to one or more segmentations.

23. The medium of claim 16, wherein constructing the speech decoding network further comprises composing a context dependency model with the word level pronunciation lexicon and the word level language model.

* * * * *